(12) United States Patent
Ehrig et al.

(10) Patent No.: US 8,177,177 B2
(45) Date of Patent: May 15, 2012

(54) ADJUSTABLE QUICK MOUNTING SYSTEM

(76) Inventors: Robert Ehrig, Allentown, PA (US); Jason K. Werkheiser, Fogelsville, PA (US)

( * ) Notice: Subject to any disclaimer, the term of this patent is extended or adjusted under 35 U.S.C. 154(b) by 192 days.

(21) Appl. No.: 12/432,365

(22) Filed: Apr. 29, 2009

(65) Prior Publication Data

US 2010/0176263 A1    Jul. 15, 2010

Related U.S. Application Data

(60) Provisional application No. 61/048,670, filed on Apr. 29, 2008, provisional application No. 61/143,841, filed on Jan. 12, 2009.

(51) Int. Cl.
  *A47B 96/06* (2006.01)
  *A47G 29/00* (2006.01)
  *A47K 1/00* (2006.01)

(52) U.S. Cl. .............. 248/218.4; 248/219.4; 248/219.1; 248/227.3; 248/230.8; 182/187

(58) Field of Classification Search .................. 248/301, 248/303, 304, 305, 306, 339, 218.4, 219.1, 248/219.4, 230.8, 219.3, 227.3, 551, 552; 182/187, 188
See application file for complete search history.

(56) References Cited

U.S. PATENT DOCUMENTS

| | | | | | |
|---|---|---|---|---|---|
| 806,963 | A | * | 12/1905 | Evans | 182/188 |
| 2,060,953 | A | * | 11/1936 | Strom | 182/187 |
| 2,696,962 | A | * | 12/1954 | Goss | 248/477 |
| 2,959,388 | A | * | 11/1960 | Fogle | 248/230.9 |
| 3,854,551 | A | | 12/1974 | Lindow | |
| 4,708,221 | A | * | 11/1987 | Kubiak | 182/187 |
| 4,909,353 | A | | 3/1990 | Govin | |
| 5,143,177 | A | * | 9/1992 | Smith | 182/187 |
| 5,199,527 | A | * | 4/1993 | Jennings | 182/187 |
| 5,409,083 | A | | 4/1995 | Thompson | |
| 5,458,215 | A | | 10/1995 | Burgin | |
| 5,469,934 | A | | 11/1995 | Pherigo | |
| 5,492,198 | A | | 2/1996 | Williams | |
| 5,515,943 | A | | 5/1996 | Antonelli | |
| 5,538,101 | A | | 7/1996 | Kempf | |
| 5,562,180 | A | * | 10/1996 | Herzog et al. | 182/187 |
| 5,605,315 | A | | 2/1997 | Hartung | |

(Continued)

OTHER PUBLICATIONS

Screaming Eagle Boss Tree stand and mounting Bracket. www.e-screamingeagle.com.

(Continued)

*Primary Examiner* — Nkeisha Smith
(74) *Attorney, Agent, or Firm* — Patrick J. Halloran

(57) ABSTRACT

An adjustable quick mounting system to be used with fixed position tree stands or similar support platforms, often found used for hunting or other outdoor activities. The adjustable mounting system includes a mounting base, detention hooks, and locking pin. The mounting base is connected securely to a tree or pole using a ratchet strap, cable or similar attachment device. The detention hooks are attached to tree stand or platform, preferably on the vertical support(s). The detention hooks are then engaged onto the mounting base by placing the open end of the detention hooks over the top portion of the mounting base. The mounting base has elongated slots manufactured into the design to allow the detention hooks to seat securely onto the base to prevent shifting of the base. The top surface of the mounting base has integrated tabs which are bent up and drilled to accept the locking pin. The top bend of the detention hooks have integrated holes that line up with the mounting tabs, in turn with the locking pin inserted, the system cannot disengage.

10 Claims, 3 Drawing Sheets

U.S. PATENT DOCUMENTS

| | | | |
|---|---|---|---|
| RE36,276 E | 8/1999 | Smith | |
| 6,085,868 A | 7/2000 | Anthony | |
| 6,196,354 B1 | 3/2001 | Anthony | |
| 6,397,973 B1* | 6/2002 | Woller | 182/187 |
| 6,766,992 B1* | 7/2004 | Parker | 248/300 |
| 7,174,995 B1* | 2/2007 | Alexander | 182/187 |
| 7,296,658 B1 | 11/2007 | Pederson | |
| 7,320,452 B2* | 1/2008 | Chen | 248/227.1 |
| 7,516,707 B2* | 4/2009 | Schrot | 108/152 |
| 2002/0096610 A1* | 7/2002 | Fernandez | 248/218.4 |
| 2003/0178255 A1 | 9/2003 | Auer | |
| 2005/0056743 A1* | 3/2005 | Ware et al. | 248/218.4 |
| 2006/0219853 A1* | 10/2006 | Molina et al. | 248/219.4 |
| 2007/0151803 A1 | 7/2007 | D'Acquisto | |
| 2007/0209410 A1 | 9/2007 | Clum | |
| 2008/0237426 A1* | 10/2008 | Walters | 248/316.8 |
| 2010/0300808 A1* | 12/2010 | Hale | 182/187 |

OTHER PUBLICATIONS

Millennium Series Tree Stands, Cam-Lock Receiver. www.huntingsolutionsusa.com.
Lone Wolf Easy Hang hook and strap. www.lonewolfstands.com.
Summit Treestands, Talon Bracket. www.summitstands.com.
Ol man Tree stands, Swing Lock and Load. www.olmanoutdoors.com.

* cited by examiner

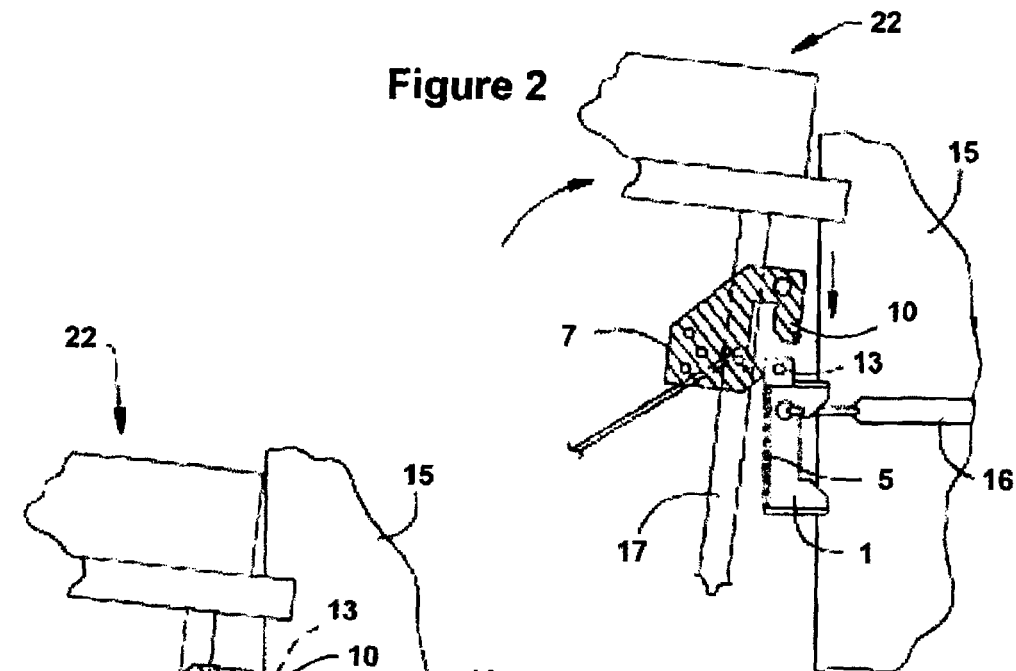
Figure 2
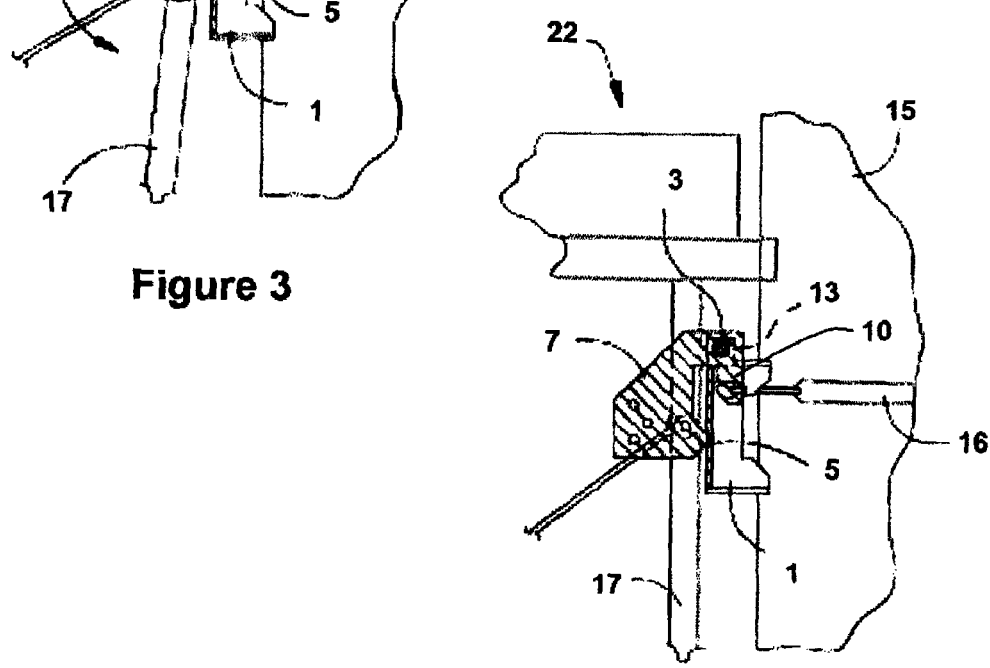
Figure 3
Figure 4

ADJUSTABLE QUICK MOUNTING SYSTEM

PRIOR APPLICATIONS

This application claims priority to U.S. Ser. No. 61/048,670 filed Apr. 29, 2008 and U.S. Ser. No. 61/143,841 filed Jan. 12, 2009.

FIELD OF DEVELOPMENT

This disclosure relates to devices for securing support systems such as platform to a solid support, such as a pole or tree.

BACKGROUND

Outdoor enthusiasts have long used tree platforms to gain a vantage point to view their surroundings. A platform secured to a tree is typically used. The common arrangement is to have a horizontal platform with vertical member(s) attached at one end. The platform is generally supported by cables which support the weight on the platform. The common practice is to attach one of these platforms to a tree or pole by using a cinch strap, chain or cable. This is often a very laborious, tiring, and dangerous task to accomplish in the field, particularly while under adverse conditions such as low light, extreme temperature while being high off of the ground.

Support systems have been previously described in, for example, U.S. Pat. Nos. 6,397,973; 5,316,014; and 5,199,527. Previously described systems attempted to alleviate the difficulties and risk associated with hanging and using a platform. Difficulties and risks remain; however, they are addressed by the devices described herein. In addition, prior support systems were not adaptable to multiple platforms other than that for which they were designed. There is a need in the art for an adjustable quick mounting system that eliminates many of the previously recognized difficulties and risks, and functions with a variety of platforms. In addition, the systems described herein are simpler and safer than previously described systems.

BRIEF DESCRIPTION OF THE DRAWINGS

FIG. 2. Illustration of the attachment of the support system to a solid support.

FIG. 3. Illustration of the attachment of the support system to a solid support.

FIG. 4. Illustration of the attachment of the support system to a solid support.

SUMMARY OF THE DISCLOSURE

Figure 1:
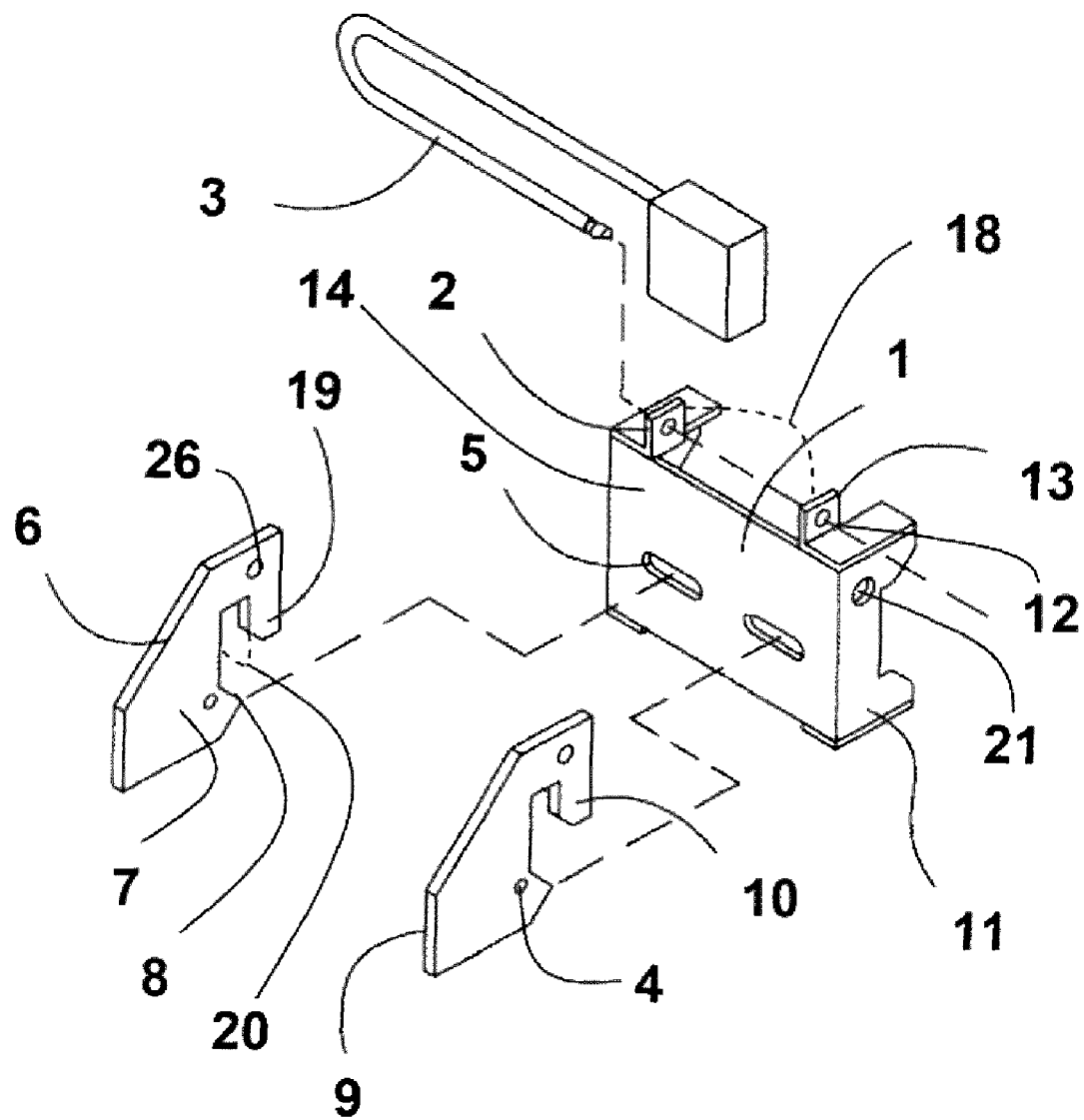
FIG. 1. Exemplary adjustable quick mounting system.

As described herein and shown in the drawings, the systems described herein are adjustable and simple to use ("adjustable quick mounting system"). The system typically includes mounting base, detention hooks, vertical support system, and locking pin. The system provides for safe, quick, and easy engagement of various types of platforms, such as tree stands, to an elevated position. For instance, in certain embodiments, the system provides for attachment to a tree or pole using a base and an attachment to a tree stand or other type of platform with a mating mechanism for the base that is adaptable to many styles of tree stand platforms. In one embodiment, the mounting base is secured to a solid support such as a tree or pole by, for example, a ratchet strap, cinch strap, cable or chain. The detention hooks are attached to the tree stand itself, preferably to the vertical support(s). The detention hooks are typically mounted to fit inside the throat of the mounting base. The tree stand may then be lowered onto the mounting base for engagement. In certain embodiments, the detention hooks include points that will seat into the slots machined into the mounting base. In this way, the system is securely seated together. In some embodiments, the top surface of the mounting base has tabs bent up on each side of the bracket. These tabs typically have an orifice or hole therein for accepting a locking pin. Similarly, the detention hooks may include an orifice or hole drilled in the top bend that lines up with the tab, to accept the same locking pin. Once the locking pin is engaged, the system is "locked" together, thus creating a safe and secure system. Other methods may be used to secure the base and tree stand or platform together in a system; however, it is important that the components essentially cannot be accidentally separated without manual disengagement.

In one embodiment, the adjustable quick mounting system for supporting a platform comprises a mounting base including rearward-projecting arms extending from the face and at least one slot in the face; and, one or more detention hooks comprising a front shank and one or more projections forming a hook; a top, bottom, front and back edge, the top and front edges being joined by a tapered edge; wherein the mounting base and detention hook may be attached to one another by lowering the detention hook onto top edge of the mounting base. The rearward-projecting arms may each comprise a tab, comprising an orifice. The rearward-projecting arms may also serve as cleats to affix the mounting base to the solid support (e.g., tree). The detention hook (or hooks) may further comprise an orifice positioned beneath the top edge and closer to the front edge than the back edge. In certain embodiments, the system further comprises a locking pin connected to the device through the orifices in the tabs and the one or more detention hooks. The one or more detention hooks comprise one or more orifices through which the same may be mounted to a platform. In certain embodiments, a gap is formed within or by the hook, and the gap is sufficiently deep to allow for attachment of the platform to the mounting base and sufficiently shallow to allow the platform to maintain a level platform. In some embodiments, the mounting base comprises an orifice through which an attachment device (e.g., a strap, cable or chain) may be inserted to attach the mounting base to a solid support. These and other considerations of the system will become apparent to those skilled in the art after reading of the following embodiment when considered with the drawings.

DETAILED DESCRIPTION

Described herein is an adjustable quick mounting system that is secure, safe, and sufficiently flexible to fit a variety of solid supports/platforms (e.g., tree stands). One use for the adjustable quick mounting system is to support platforms that are attached to trees. These platforms are typically used by hunters to provide a wide perspective of the surrounding environment. These platforms are typically fixed to trees at substantial heights and therefore must be very simple to attach to the tree and extremely stable once attached. Multiple previously published documents are referred to in this description; each and every document referred to herein is hereby incorporated by reference, in its entirety.

As described herein and shown in the drawings, the systems described herein are adjustable and simple to use ("adjustable quick mounting system"). A significant advantage is that the mounting base system is separate from the elevated platform, such that the user may hang the relatively light mounting base from an elevated position separate from the platform itself. Another benefit of the mounting system's design is that it can be safely and securely locked to the mounting base and tree. Another important advantage is that the system is compatible with a wide variety of platforms (e.g., hang-on tree stands). Still another advantage of the present invention is theft prevention. The locking pin can easily be replaced with a long shank padlock, where the whole system (tree stand included) could be locked to the tree/pole with a cable or chain.

The system typically includes a mounting base, detention hooks, vertical support system, and locking pin. An advantage of this system is its flexibility to conform to different styles of platforms (e.g., tree stands). The detention hooks may be mounted to the vertical support member(s) of the tree stands/platforms. Several different styles of tree stands are being manufactured, most commonly with single or double vertical supports; which are typically a 0.75" to 2" round or square steel or aluminum tube. The detention hooks are mounted to the vertical member(s), preferably where the support cables are attached. When a tree stand has two vertical support members, the detention hooks are mounted to the inside or outside of the vertical supports, which ever accommodates the width of the throat of the mounting base. Several different sized mounting bases are available to accommodate the throat size of various tree stands.

Engagement of the detention hooks onto the mounting base is safe and simple. The user simply lowers the open end of the hooks down over the top section of the mounting base. Once the throat of the hook contacts the plate of the mounting base, the points on the detention hooks will automatically seat into the slot machined into the mounting base. Under tension, the seats inhibit the stand from shifting. With this simple engagement/disengagement process, the user could position mounting bases at multiple locations, hence reducing the overall cost by only having to own one platform and providing the ability to move to different locations quickly and easily.

Referring now in detail to FIGS. 1-5, wherein like reference numerals represent like figures depicted throughout several views, FIG. 1 provides a general view of the adjustable quick mounting system including but not limited to, for example, mounting base 1, one or more detention hooks 7 and/or 9, and a locking system including at least one locking tab (e.g., 2, 13 (which may form part of mounting base 1)) into which a locking device (e.g., locking pin 3) may be attached or inserted. The system typically includes each of these components, but may optionally include only one, two, three, four, five, or six such components, optionally along with some or all of the other components described herein or available to one of skill in the art.

The various parts of the device described herein may be made of any suitable fracture-resistant material capable of supporting significant weight, and the various parts may be made of the same or different materials. It is particularly important that mounting base 1 and the one or more detention hooks 7 and/or 9 are constructed from a fracture-resistant material capable of supporting the weight of the system and the user without failing. Typical materials include plastics (e.g., high-strength plastics), metals, or combinations thereof. For example, in certain embodiments, "plastic steel" may be used (e.g., Podsiadlo, et al. Science, Vol. 318, No. 5847, pp. 80-83, Oct. 5, 2007, incorporated herein by reference in its entirety). In other embodiments, a metal such as steel may be used. Suitable steels include any of those known in the art including, for example, various combinations of alloys such as, for example, carbon steel, high strength low alloy steel (typically containing about <2% by weight of other elements such as manganese, molybdenum, chromium or nickel), magnetic or non-magnetic steel, tool steel (including, for example, tungsten or cobalt), weathering steel (e.g., Cor-ten), dual-phase steel (e.g., containing a ferritic and martensitic microstructure), Hadfield steel (e.g., containing about 12-14% manganese), and superalloys, or galvanized steel (e.g., electroplated in zinc to resist rust). In some embodiments, steel commonly known as 3/16 plate steel may be used.

Still referring to FIG. 1, mounting base 1 includes an outer surface or "face" 14 and an inner surface. Relative to the inner surface, the outer surface/face is typically positioned further from the solid support to which the device is attached. The mounting base is typically in the shape of a square or rectangle (a top and bottom horizontal edge, and two vertical edges) but may be of any suitable shape (e.g., triangle, circle, oval, rhombus, or the like). One or more arms 11 are also typically attached to face 14, and are optionally rearward-projecting relative to face 14. Arms 11 typically extend toward the solid support, and are positioned nearer to the solid support than face 14. The mounting base typically has one or more slots 5 (e.g., two as shown in FIG. 1) "punched out" into which a projection (e.g., "tip", 8) of a detention hook (e.g., 7, 9) will insert or be seated. Slots 5 may be positioned in face 14 at a suitable distance (e.g., one inch) from the vertical edges of the face portion and a suitable distance from the horizontal edges of the face portion (e.g., three inches). Each slot 5 is also of suitable length (e.g., two-and-one-half inches) such that detention hooks 7 and 9 may be inserted and stably attached to the mounting base 1.

Arms 11 may be formed by any suitable method including, for example, actually be during production, folding an extension of face 14 of mounting base 1. In this embodiment, then, mounting base 1 and arms 11 may be formed from a single piece of material. Arms 11 may alternatively be attached to mounting base 1 using, for example, a welding process. The arms 11 typically attach one or more tabs 2 and/or 13, each preferably including a hole 12 in each tab. Tabs 2 and 13 may be positioned on either the interior or exterior portion of arms 11. In FIG. 1, tabs 2 and 13 are positioned on the interior portion of arms 11. The tabs are preferably upwardly facing (e.g., project up from the top edge of the mounting base or arms). Tabs 2 and 13 may be constructed to engage locking pin 3, thus reducing the likelihood of a system failure and/or theft. Arms 11 also optionally include a hole 21 positioned in the upper portion thereof to be used for securing the device to the solid support, as described below. Arms 11 are typically sufficiently spaced apart from one another (e.g., at least about one, two, three, four, five six, seven or eight inches) and of a sufficient depth (e.g., at least about one, two, three, four, five, six, seven or eight inches) to allow space for hooks 7, 9 to be attached to mounting base 1, but also shallow enough to allow the platform 22 to remain level. As described below, detention hooks 7 and 9, as shown in FIG. 1, typically include one or more projections 8 to attach to mounting slots 5 and shanks 10 and 19. Arms 11 also optionally include one or more projections that serve as "cleats", by biting into the tree or pole to ensure a secure attachment.

A typical size for the mounting base is approximately one, two, three, four, five, six, seven or eight inches in height; approximately two, three, four, five, six, seven, or eight inches in width; and, approximately one, two, three, four, five, six, seven or eight inches deep (e.g., the length of the rearward-projecting arms). As would be understood by one of skill in the art, such exemplary measurements would typically change based on the size of the mounting base. The distance between the tabs 2 and 13 is referred to as the "throat" 18 of mounting base 1. As would be understood by one of skill in the art, the height, width and depth of the throat will vary with that of mounting base 1. The width and depth of throat 18 may limit the types of solid supports to which the device may be attached.

Detention hooks 7 and 9 of FIG. 1 may include a hook or "front shank" (e.g., 10, 19) as well as one or more projections 8. The detention hook may include a top and a front edge, the two edges being connected by a tapered edge 6. Below the top edge may be hole 26 for accepting locking pin 3. As described above, the detention hooks are typically constructed from a fracture-resistant material capable of supporting the weight of the system and the user without failing. A suitable material would include, for example, and not be limited to, ⅛" plate steel. The size of the detention hooks will vary with that of the mounting base to which the detention hooks are attached. For example, the detention hooks may be manufactured from an approximately 3"×3" piece of starting material. The front shank 10 may be manufactured to any suitable size (e.g., approximately 1" tall and approximately ¾" wide), thus providing a variably-sized hook opening (20) (e.g., ¾" wide). The front shank 10, 19 is typically tapered rearward thus making the front edge longer than the rear edge. This provides the hook with an effectively larger opening through which the mounting base 1 may be engaged. The rear edge is continuous with projection 8. The rear portion of the hook (e.g., the part of the hook to which 7 and 9 point) is typically approximately, one, two (preferred), three or four inches wide with multiple holes 4 drilled therein to allow attachment to various types of platforms (e.g., tree stands). Projections 8 are incorporated onto the lower rear portion of the hook to seat the hooks into mounting base slots 5, thereby preventing the platform from shifting under tension.

As shown in FIGS. 2, 3, 4 and 5, mounting base 1 may be attached to solid support 15 (e.g., a pole or tree) by an attachment device 16 (e.g., a strap, chain, cable or the like) rated for adequate weight that can be tensioned tightly. Attachment device 16 is connected to mounting base 1 via hole 21 (FIG. 1). The positioning of hole 21 (FIG. 1) prevents the mounting base 1 from rolling forward under load. When placing the mounting base on a tree or pole, one end of the attachment device (e.g., ratchet strap) is hooked through the hole 21 of mounting base 1. At the desired height (e.g., on a pole or tree), the other end of the attachment device (e.g., ratchet strap) is looped around the tree and hooked on the opposite side of mounting base 1 (also through hole similar to 21). Mounting base 1 may then be leveled while simultaneously tightening the attachment device (e.g., ratchet strap) on the solid support (e.g., pole or tree). The mounting base must be fairly level since its angle is identical to the platform angle that the user will be supported. The projections of arms 11 (FIG. 1) of the mounting base typically insert into (e.g., "dig") the tree when tension is applied to attachment device 16. The support provided by the combination of the detention hooks 7, 9 and attachment device 16 provides a safe and secure mounting platform.

Figure 5:
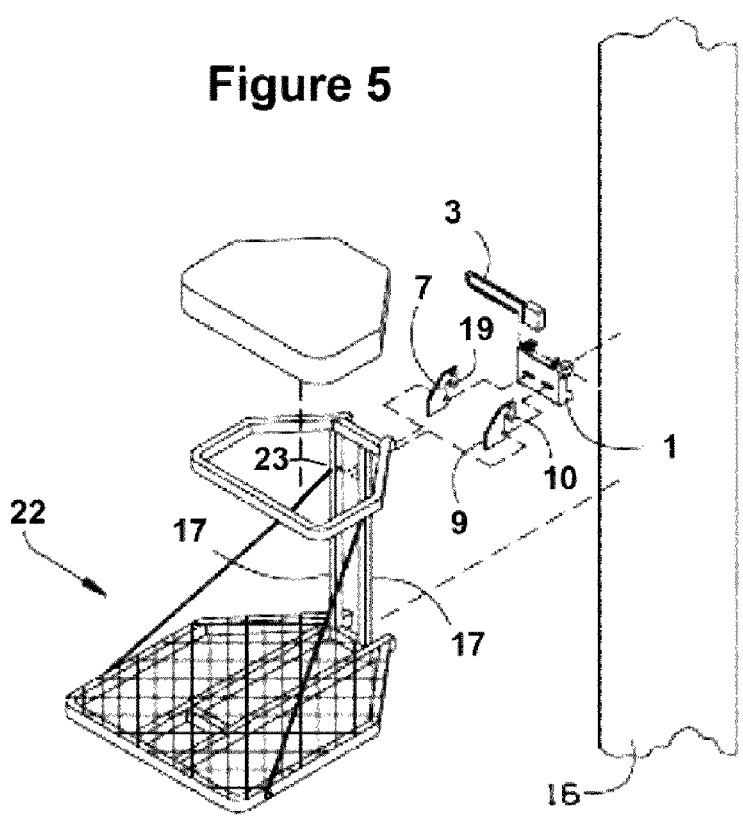
FIG. 5. Exemplary adjustable quick mounting system.

There are many methods of attaching the detention hooks to the upright supports 17 (FIG. 5), with two specific method discussed here. The first method, but not limited to, is where the detention hooks 7, 9 may be mounted to the vertical member(s) 17 by means of bolting, welding, riveting or any sufficient means of secure attachment. The preferred, but not exclusive method of attachment would be to mount the detention hooks 7, 9 to the vertical riser(s) 17 using the existing bolts 23 (FIG. 5) where the platform support cables/braces are attached to the vertical riser(s) 17. As described above, multiple holes 4 (FIG. 1) may be included in the detention hooks that accommodate vertical risers 17 of different diameters. Multiple holes 4 may be included in detention hooks 7 and 9 in order to allow the rear of the hook shank to be mounted flush with the rear of the vertical riser 17, thus maintaining a level platform (e.g., a hang-on style tree stand) 22. As shown in FIG. 5, detention hook(s) 7 and 9 may be attached to the platform 22 and affixed to mounting base 1 by positioning the open portion of the detention hooks 7 and 9 over the top edge of the mounting base 1. The platform 22 (e.g., tree stand platform) may then be lowered onto the mounting base 1. The detention hooks may be seated completely into the throat of mounting base 1. Once seated, detention hook projections 8 (FIG. 1) are engaged into the mounting slots 5 (FIG. 1). Still referring to FIG. 5, the locking pin 3 may be attached to the mounting base 1. Locking pin 3 typically serves to lock the detention hooks to the mounting base to prevent separation thereof. Locking pin 3 (typically a pin, bolt, or lock) typically locks through the holes in tabs 2 (FIG. 1) and 13 (FIG. 1) and the detention hooks 26 (FIG. 1).

Figure 6:
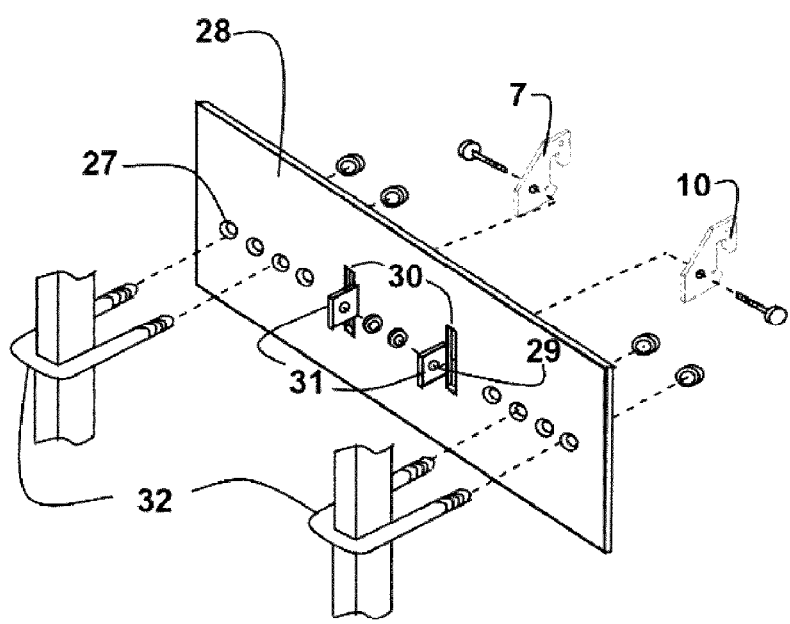
FIG. 6. Exemplary adjustable quick mounting system including variable mounting plate.

FIG. 6 illustrates yet another embodiment of this system. In this embodiment, detention hooks 7 and 9 may be attached to the vertical risers using the variable mounting plate system shown in FIG. 6. The mounting plate 28 is typically a flat plate of a suitable length, width, and depth (e.g., approximately 5 inches by 12 inches, 3/16 inch steel). The plate typically includes more than one (e.g., two, three, four, five, six, typically in pairs) vertical slots 30 of approximately of suitable length (e.g., one, two, three or more inches) approximately evenly spaced from the vertical center of the plate. The slots may be spaced, for example, one, two, three, four, or more inches apart. Typically two tabs 31 attached to the plate on the inner side of each slot 30. The tab(s) 31 is attached by any secure means as described herein or as is known in the art (e.g., by welding). The tab may be positioned perpendicular to the slot, and may also be centered on the slot (FIG. 6). Detention hooks 7 and 9 may be positioned into the slot such that hole 29 in the tab aligns with one of the holes in the detention hook (e.g., 7, 9). The detention hooks 7 and/or 9 may be fixably (including, temporarily or permanently) secured to the tabs by any suitable mechanism including, for example, a bolt. Using the variably placed slots, the plate is sufficiently wide enough to span the throat of vertical risers of many different configurations (e.g., as found in various tree stands). The plate may also have multiple slots/holes 27 at sufficiently spaced (e.g., equally spaced) on either side of the vertical slot. The slots provide adjustable mounting positions for accommodating varying width vertical supports. U-bolts or L-brackets 32 are the preferred, but not limited to, method to attach the plate to the vertical supports of the platform. The plate 28 may be manufactured from any high strength material as previously mentioned or other suitable material; it has been found that 3/16 plate steel, for example, is sufficient. Thus, in one embodiment, FIG. 6 illustrates a variable mounting plate comprising multiple vertical slots, multiple tabs, each tab comprising at least one first orifice, the mounting plate further comprising at least one second orifice, wherein a detention hook may be secured to the mounting plate through the vertical slots by attachment to the tabs through the first orifice, wherein the mounting plate may also be attached to a solid support surface using at least one second orifice.

In certain embodiments, locking pin 3 may form an integral part of the mounting system, providing four significant advantages: 1) it may prevent the stand from being knocked from its mounting base accidentally; 2) it may prevent the tree stand from shifting under load; 3) it may be used as a security device for theft prevention (e.g., when combined with a locking chain or cable system); and, 4) it may maintain the detention hooks alignment with the mounting base vertically.

While the present invention has been described in terms of the preferred embodiments, it is understood that variations and modifications will occur to those skilled in the art. Therefore, it is intended that the appended claims cover all such equivalent variations that come within the scope of the invention as claimed.

What is claimed is:

1. A system supporting and attaching a platform to a solid support, the system comprising:
   a mounting base comprising a top edge and one or more support arms extending from the mounting base, the one or more support arms comprising at least one locking tab having at least one orifice therein;
   one or more detention hooks comprising: a) a front shank for attaching the one or more detention hooks over the top edge of the mounting base, and b) at least one hole for accepting a locking pin and at least one additional hole attaching the detention hooks to the platform the locking pin for connecting the mounting base and the one or more detention hooks through the at least one orifice in the locking tab and the at least one hole in the one or more detention hooks.

2. The system of claim 1 wherein the platform is a tree stand.

3. The system of claim 1 wherein the mounting base and one or more detention hooks are constructed of a fracture-resistant material.

4. The system of claim 3 wherein the material is plastic or metal.

5. The system of claim 1 wherein the mounting base further comprises an orifice through which an attachment device may be inserted to attach the mounting base to a solid support.

6. The system of claim 5 wherein the attachment device is selected from a group consisting of a strap, cable and a chain.

7. The system of claim 1 wherein the mounting base comprises one or more slots therein.

8. The system of claim 7 wherein the mounting base comprises two slots.

9. The system of claim 7 wherein the one or more detention hooks comprise a projection for insertion into the one or more slots of the mounting base.

10. The system of claim 1 wherein the solid support is a tree.

* * * * *